(12) United States Patent
Esser

(10) Patent No.: US 8,979,094 B2
(45) Date of Patent: Mar. 17, 2015

(54) PISTON RING

(75) Inventor: Peter-Klaus Esser, Kuerten (DE)

(73) Assignee: Federal-Mogul Burscheid GmbH, Burscheid (DE)

( * ) Notice: Subject to any disclaimer, the term of this patent is extended or adjusted under 35 U.S.C. 154(b) by 0 days.

(21) Appl. No.: 13/980,994

(22) PCT Filed: Jan. 9, 2012

(86) PCT No.: PCT/DE2012/000013
§ 371 (c)(1),
(2), (4) Date: Jul. 22, 2013

(87) PCT Pub. No.: WO2012/107012
PCT Pub. Date: Aug. 16, 2012

(65) Prior Publication Data
US 2013/0307221 A1  Nov. 21, 2013

(30) Foreign Application Priority Data

Feb. 9, 2011 (DE) .......................... 10 2011 010 656

(51) Int. Cl.
*F16J 9/00* (2006.01)
*F16J 9/12* (2006.01)
*F16J 9/14* (2006.01)
*F16J 9/26* (2006.01)

(52) U.S. Cl.
CPC .... *F16J 9/12* (2013.01); *F16J 9/14* (2013.01); *F16J 9/26* (2013.01)
USPC .............................. 277/442; 277/440; 277/499

(58) Field of Classification Search
USPC ................. 277/434, 440, 442, 498, 499, 441
See application file for complete search history.

(56) References Cited

U.S. PATENT DOCUMENTS

| | | | | |
|---|---|---|---|---|
| 1,251,906 A | * | 1/1918 | Moratta | 277/441 |
| 4,176,434 A | * | 12/1979 | Cromwell et al. | 29/888.074 |
| 4,256,318 A | * | 3/1981 | Bush | 277/435 |
| 5,380,018 A | | 1/1995 | Mader et al. | |
| 8,365,696 B2 | * | 2/2013 | Ishida | 123/193.6 |
| 2002/0041071 A1 | | 4/2002 | Mittler et al. | |
| 2004/0056425 A1 | | 3/2004 | Miida | |
| 2010/0044967 A1 | | 2/2010 | Esser et al. | |

FOREIGN PATENT DOCUMENTS

| | | |
|---|---|---|
| CN | 101929405 | 12/2010 |
| DE | 2135 338 | 1/1973 |
| DE | 36 12 456 | 10/1987 |
| DE | 41 40 232 | 7/1993 |
| DE | 100 41 802 | 2/2002 |
| DE | 10 2007 007 962 | 5/2008 |
| EP | 1 359 351 | 11/2003 |
| JP | 3-125077 | 5/1991 |

* cited by examiner

*Primary Examiner* — Gilbert Lee
(74) *Attorney, Agent, or Firm* — Jordan and Hamburg LLP

(57) ABSTRACT

A piston ring, in particular a compression piston ring, includes a main body, which has a radially outer running surface, a radially inner circumferential surface, an upper and a lower flank surface, and a joint, wherein the running surface is provided with at least one circumferential recess which receives a wear-resistant coating, in particular a PVD coating, and wherein, starting from respective end faces of the joint, as seen in the circumferential direction of the main body, a land shoulder is integrally formed on the main body outside the coating and extends at a predetermined radial height over a predetermined circumferential length on both sides of the joint.

7 Claims, 3 Drawing Sheets

PISTON RING

BACKGROUND OF THE INVENTION

The invention relates to a piston ring, and in particular a compression piston ring.

The running surfaces of piston rings, and in particular of compression piston rings, in internal combustion engines experience a particularly high load at the ring joint end faces, as a result of thermal and mechanical stress. In general, this results in excessive wear and potentially in thermal overload with ensuing seizing. This location in the piston ring constitutes a key weak area in terms of the service life of the piston ring.

The running surfaces of piston rings are frequently provided with hard coatings. However, these generally cannot prevent the partial phenomenon. The ring shape can be optimized in a way that minimizes the joint pressure so as to provide relief at the joint end faces.

Examples of such measures are described as follows:

DE 41 40 232° C.1 discloses a self-tensioning piston ring having a non-uniform radial pressure distribution. The piston ring, when tensioned to the nominal diameter, has a radius of curvature that corresponds to the cylinder radius at the joint end faces in the region $\alpha < 25°$. The radius of curvature is smaller than the cylinder radius in the angle region $\beta = 25$ to $35°$ on both sides of the ring joint so that the radial pressure distribution at the joint end faces is virtually zero, but is in excess of 200% of the mean radial pressure in the angle region $\beta = 25$ to $35°$.

DE 36 12 456 A1 describes a piston ring, in which design measures in the ring joint region make pressure equalization via the lower flank more difficult, and wherein the joint end faces are pressed against the lower flank, optionally by way of additional spring elements or by a separate spring-like configuration, in a direction opposite the force of inertia.

DE 100 41 802 C1 describes a compression piston ring, which has a reduced cross-sectional area at the ring circumference, wherein the ring circumference of the compression piston ring is divided into four quadrants. When the one end face is positioned in the first quadrant and the other end face is positioned in the fourth of the imaginary quadrants, the respective reduced cross-sectional area is located exclusively in the first and fourth quadrants, on both sides of the ring joint, and more particularly in the circumferential region in the vicinity of the joint as seen across the entire ring height wherein, once again, the same radial wall thickness as in the region of the ring back is present in the joint region.

DE 10 2007 007 962 B3 discloses a piston ring, comprising a main body that has a running surface provided with a recess, an upper and a lower flank surface, and an inner circumferential surface, wherein at least the recess is provided with at least one wear protection layer and a PVD (physical vapor deposition) topcoat is applied to at least a portion of the running surface, so that the main body, in the finished state thereof, has the PVD topcoat only in the edge region, which is to say outside the recess.

SUMMARY OF THE INVENTION

All the measures described above have not been suitable for completely eliminating the phenomenon of joint overload in piston rings, in particular in compression piston rings. This applies in particular to rings of axially low dimension.

It is the object of the invention to provide a piston ring, and in particular a compression piston ring, in which no joint overload is present in the joint region, in the operating state, so that increased service life is achieved as compared to the related art.

This object is achieved by a piston ring, in particular a compression piston ring, comprising a main body, which has a radially outer running surface, a radially inner circumferential surface, an upper and a lower flank surface, and a joint, wherein the running surface is provided with at least one circumferential recess, which receives a wear-resistant coating, in particular a PVD coating, wherein, starting from the land edges of the joint, as seen in the circumferential direction of the main body, a land shoulder is integrally formed on the main body outside the coating and extends at a predeterminable radial height over a defined circumferential length on both sides of the joint.

Using a suitable ring design, especially in the case of PVD-coated piston rings, and more particularly compression piston rings, the joint can be designed so that average joint pressure is present during the break-in period of the piston ring, in particular of the compression piston ring. The land shoulder provided exclusively in the region of the piston ring in the vicinity of the joint is made of the same material as the main body, for example cast iron or steel, and is provided outside the coating. During further operation of the engine, this relatively soft shoulder wears comparatively quickly, and thereafter the piston ring runs on the designated crest thereof. It is only then that the actual ring contour of the piston ring is achieved. As a result of the relief at the joint thus achieved, an oil film, which is equal to or thicker than on the remaining circumference of the piston ring, can develop in this region. The improved or more uniform lubrication prevents thermal overload of the joint region, reduces wear, and thus increases the useful life of the piston ring, in particular of the compression piston ring.

BRIEF DESCRIPTION OF THE DRAWINGS

The subject matter of the invention is shown in the drawings based on an exemplary embodiment and is described as follows. In the drawings.

DETAILED DESCRIPTION OF THE INVENTION

Figure 1:
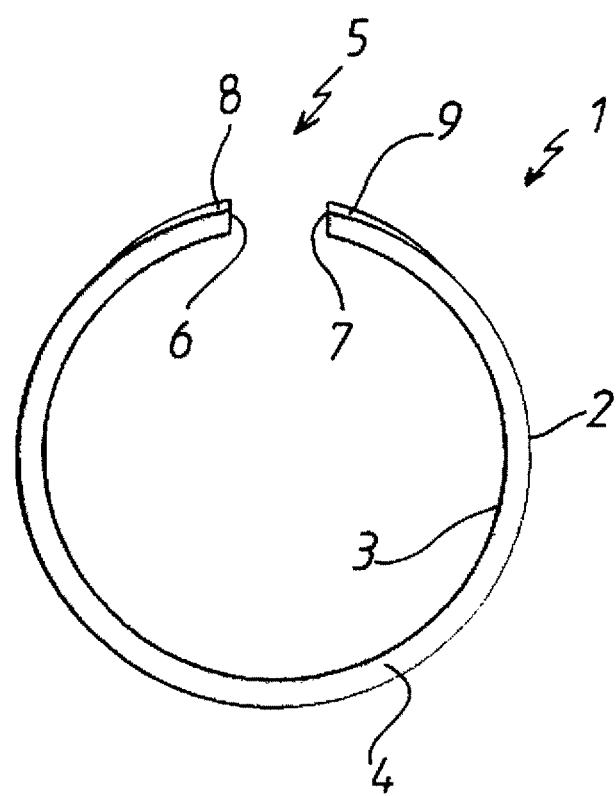
FIG. 1 is a top plan view onto a piston ring provided with a joint.

FIG. 1 shows a piston ring designed as a compression piston ring, comprising a main body 1, which in the present example is made of cast iron. The top view onto the main body 1 shows the running surface 2, the inner circumferential surface 3, the upper flank surface 4, and the joint 5. Starting from the end faces 6, 7 of the joint 5, a land shoulder 8, 9 having a predetermined height and defined circumferential length extends in the circumferential direction on both sides of the joint 5. Depending on the engine, the land shoulder 8, 9 has a radial height at the respective end faces 6, 7 of the joints of at least 1 to 10 µm, the radial height of the land shoulder 8, 9 adjacent the respective end faces 6, 7 of the joint 5 being the maximum radial height of the land shoulder 8, 9, and transitions (i.e., tapers) into the curvature of the main body 1 across a maximum circumferential length corresponding to a circumferential angle of the land shoulder 8, 9 in total of up to 45°. The respective height of the land can be dependent on the engine type.

Figure 2:
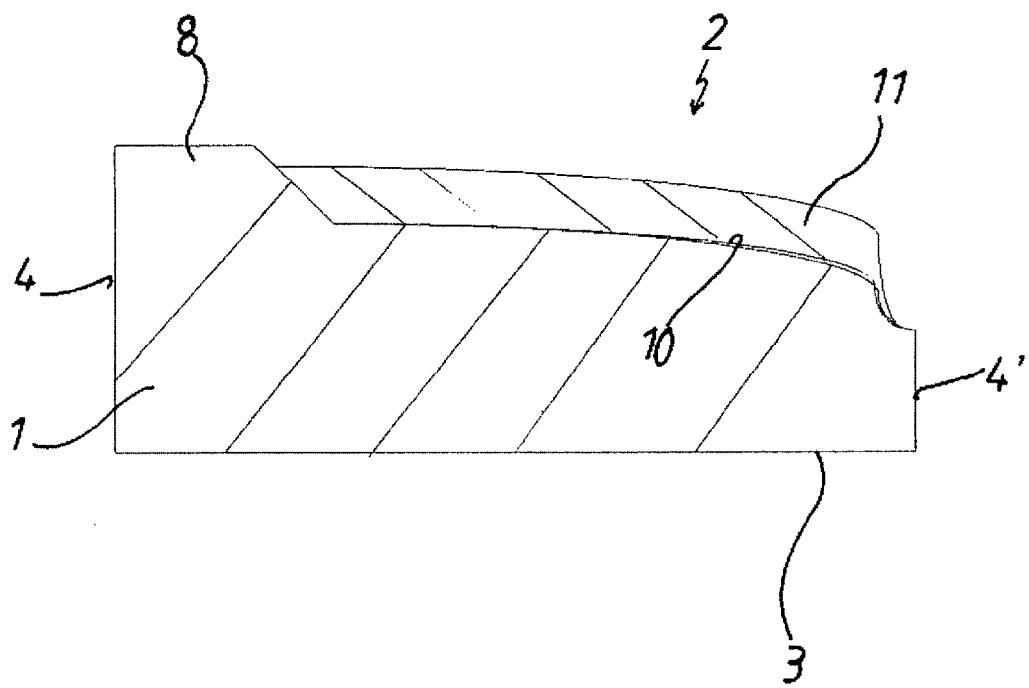
FIG. 2 is a cross-sectional view through the piston ring provided with a recess according to FIG. 1 prior to the break-in phase.

FIG. 2 shows the main body 1 according to FIG. 1 in a cross-sectional view. The running surface 2, the inner circumferential surface 3, the upper flank surface 4, which is to say the one facing the combustion chamber, and the lower flank surface 4', which is to say the one facing the cylinder crankcase, can be seen. The main body 1 is provided with a circumferential recess 10, which receives a wear-resistant coating 11, which in this example is a PVD layer. Outside the coating 11, the respective land shoulder, shown in FIG. 1, which here is land shoulder 8, is provided, which is made of the same material as the main body 1. As is shown, the and shoulder 8 protrudes above the coating 11 with a predeterminable radial height. FIG. 2 shows the main body 1 prior to the break-in phase thereof.

Figure 3:
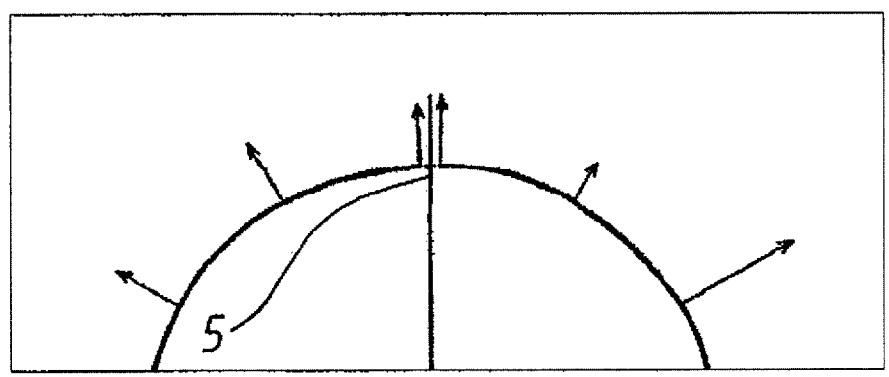
FIG. 3 shows the radial pressure distribution of the piston ring according to FIG. 2.

FIG. 3 shows the radial pressure distribution of the main body 1 prior to the break-in phase of the piston ring. The joint 5 is only suggested here, and it is apparent that the radial pressure distribution in the joint region is relatively high prior to the break-in phase.

Figure 4:
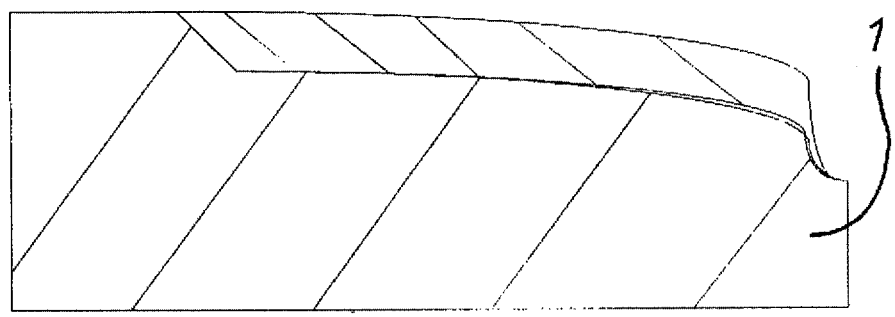
FIG. 4 is a cross-sectional view through the piston ring provided with a recess according to FIG. 1 after the break-in phase.

FIG. 4 shows the main body 1 of the piston ring according to FIG. 1 after the break-in phase thereof. It is apparent that the land shoulder 8 shown in FIG. 2 has been worked off, so that the designated crest of the main body 1 now bears on the counter running surface, which is not shown in detail.

Figure 5:
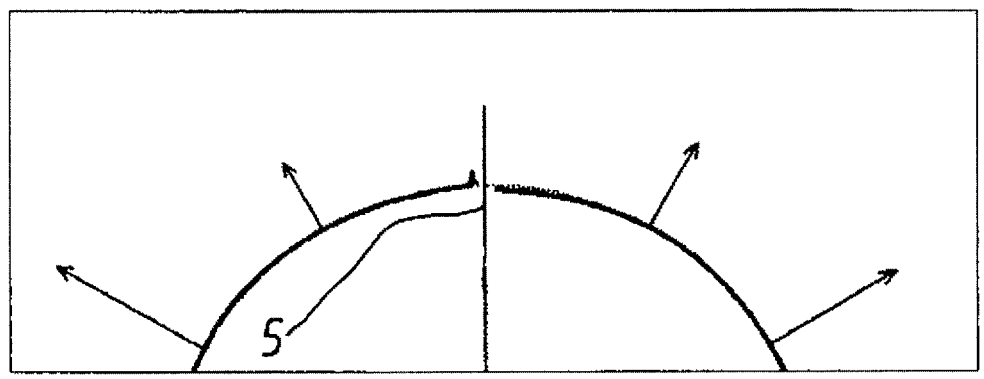
FIG. 5 shows the radial pressure distribution of the piston ring according to FIG. 4.

FIG. 5 shows the radial pressure distribution of the main body 1 after the break-in phase thereof, wherein it is apparent that a lower radial pressure distribution is present at the joint 5, which is only suggested, as compared to before the break-in phase. Because of the relief at the joint thus attained, an oil film, which is equal to or thicker than on the remaining circumference of the main body, can form in this region. As a result of this improved or more uniform lubrication, thermal overload of the joint region is prevented and the wear reduced, which is advantageous in terms of useful life.

After the engine had been run, the piston ring according to the invention did not show worn joints, but rather showed a uniform bearing contact surface.

The invention claimed is:

1. A compression piston ring comprising a main body which includes
   a radially outer running surface,
   a radially inner circumferential surface,
   an upper flank surface and a lower flank surface and
   a joint,
   wherein the running surface is provided with at least on circumferential recess which receives a wear-resistant PVD coating, and
   wherein, starting from respective end faces of the joint, as seen in circumferential direction along the main body, a land shoulder is integral with the main body and extends radially outward beyond the coating to a predetermined radial height in excess of a radial height of the coating, said land shoulder extending circumferentially from the joint for a predetermined circumferential length tapering to a radial height flush with the coating; and
   wherein the radial height of the land shoulder at the respective end faces of the joint is from 1 to 10 μm.

2. The piston ring according to claim 1, wherein the land shoulder is made of the same material as the main body.

3. The piston ring according to claim 2, wherein the land shoulder and the main body are made of cast iron or steel.

4. The piston ring according to claim 1, wherein the circumferential length of the land shoulder in total corresponds to a circumferential angle of up to 45°.

5. The piston ring according to claim 1, wherein maximum radial height of the land shoulder is adjacent the respective joint end faces.

6. The piston ring according to claim 1, wherein the running surface in cross section from the upper flank surface to the lower flank surface comprises the land shoulder and the recess, the upper flank occurring from the upper flank surface toward the lower flank surface with the recess occurring between the land shoulder and the lower flank surface.

7. The piston ring according to claim 1, wherein, the lower flank surface has a smaller radial width than the upper flank surface along an entire circumferential length of the land shoulder.

* * * * *